United States Patent
Kondo et al.

(10) Patent No.: US 10,245,732 B2
(45) Date of Patent: Apr. 2, 2019

(54) RECEPTION SYSTEM AND RECEPTION METHOD

(71) Applicant: HONDA MOTOR CO., LTD., Tokyo (JP)

(72) Inventors: Hiroshi Kondo, Wako (JP); Naoaki Sumida, Wako (JP); Asuka Shiina, Wako (JP); Shunichi Yamamoto, Wako (JP); Kazuhiro Nakadai, Wako (JP); Keisuke Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 15/470,088

(22) Filed: Mar. 27, 2017

(65) Prior Publication Data
US 2017/0282373 A1    Oct. 5, 2017

(30) Foreign Application Priority Data

Mar. 29, 2016  (JP) ................................ 2016-066568

(51) Int. Cl.
| | | |
|---|---|---|
| *G01C 21/00* | (2006.01) | |
| *B25J 11/00* | (2006.01) | |
| *B25J 9/16* | (2006.01) | |
| *G06K 9/00* | (2006.01) | |
| *G10L 15/22* | (2006.01) | |

(52) U.S. Cl.
CPC ......... *B25J 11/0005* (2013.01); *B25J 9/1697* (2013.01); *B25J 11/008* (2013.01); *G06K 9/00771* (2013.01); *G10L 15/22* (2013.01); *G05B 2219/45095* (2013.01); *G06K 9/00288* (2013.01); *G10L 2015/223* (2013.01)

(58) Field of Classification Search
CPC .... B25J 11/0005; B25J 11/008; B25J 9/1697; G06K 9/00771; G06K 9/00288; G10L 15/22; G10L 2015/223; G05B 2219/45095
See application file for complete search history.

(56) References Cited

U.S. PATENT DOCUMENTS

| | | | |
|---|---|---|---|
| 2013/0073473 A1* | 3/2013 | Heath ..................... | G06Q 30/02 705/319 |
| 2013/0225202 A1* | 8/2013 | Shim .................. | G06F 17/30241 455/456.3 |
| 2014/0129942 A1* | 5/2014 | Rathod ............ | H04N 21/44222 715/720 |

(Continued)

FOREIGN PATENT DOCUMENTS

JP    4594857    9/2010

*Primary Examiner* — Ian Jen
(74) *Attorney, Agent, or Firm* — Rankin, Hill & Clark LLP

(57) ABSTRACT

A reception system includes: an imaging unit that captures an image; a reception information storage unit that stores an image of a visitor who visited in the past and information of a receiving person whom the visitor visited in the past in an associated manner; and an action performing unit that generates a question to the visitor based on a scenario regarding a response to the visitor and acquires information via a response to the question from the visitor, wherein the action performing unit changes a response presented to the visitor based on the scenario depending on whether or not the reception information storage unit stores an image that corresponds to the image captured by the imaging unit.

9 Claims, 13 Drawing Sheets

(56) References Cited

U.S. PATENT DOCUMENTS

2016/0098804 A1\* 4/2016 Mascaro .............. G06Q 40/123
 705/31
2016/0111021 A1\* 4/2016 Knoche ................... G09B 7/00
 434/262

\* cited by examiner

FIG. 4 g101

| VISIT DATE | VISITOR NAME | FACE IMAGE | VISITOR AFFILIATION | RECEIVING PERSON NAME | RECEIVING PERSON AFFILIATION |
|---|---|---|---|---|---|
| 2016/03/14 10:10:00 | ICHIRO TANAKA | ABC.jpg | XX DESIGN | HARUKO TAKENAKA | DESIGN CENTER |
| 2016/03/15 12:10:30 | GORO SATO | DEF.jpg | YY & CO., LTD. | HANAKO WATANABE | GENERAL AFFAIRS DIVISION |
| 2016/03/15 12:45:00 | TARO YAMADA | GHI.jpg | ZZ ELECTRONICS | ZIRO MIYAKE | FIRST DEVELOPMENT DIVISION |
|  |  |  |  |  |  | g102

| STAFF MEMBER NAME | AFFILIATION | PHONE NUMBER |
|---|---|---|
| ZIRO MIYAKE | FIRST DEVELOPMENT DIVISION | 00-0X000 |
| HARUKO TAKENAKA | DESIGN CENTER | 00-0X0X0 |
| HANAKO WATANABE | GENERAL AFFAIRS DIVISION | 00-XXXX |
|  |  |  |

FIG. 6

- R11 — ROBOT "HELLO."
- R12 — ROBOT "THIS IS RECEPTION SYSTEM. I WILL CONTACT STAFF MEMBER YOU WOULD LIKE TO VISIT."
- R13 — ROBOT "PLEASE TELL ME YOUR NAME."
- H11 — CUSTOMER "MY NAME IS TANAKA."
- R14 — ROBOT "DID YOU SAY MR. TANAKA?"
- H12 — CUSTOMER "YES."
- R15 — ROBOT "PLEASE LET ME KNOW NAME OF PERSON YOU ARE HERE TO VISIT."
- H13 — CUSTOMER "I AM HERE TO SEE MR. MIYAKE."
- R16 — ROBOT "DID YOU SAY YOU ARE HERE TO SEE MR. MIYAKE OF FIRST DEVELOPMENT DIVISION?"
- H14 — CUSTOMER "YES."
- R17 — ROBOT "I'M CALLING MR. MIYAKE. PLEASE WAIT."
- R18 — ROBOT "PHONE CALL IS CONNECTED. PLEASE WAIT ON SOFA UNTIL MR. MIYAKE ARRIVES."

FIG. 7

R13 — ROBOT "PLEASE TELL ME YOUR NAME."
H11 — CUSTOMER "MY NAME IS TANAKA."
R14A — ROBOT "DID YOU SAY MR. TAKENAKA?"
H12A — CUSTOMER "NO, I DIDN'T."
R13A — ROBOT "I'M SORRY. COULD YOU TELL ME YOUR NAME AGAIN."

... ...

R17 — ROBOT "I'M CALLING MR. MIYAKE. PLEASE WAIT."
R18A — ROBOT "PHONE CALL WAS NOT CONNECTED. I'M CALLING ONE OF HIS CO-WORKERS."

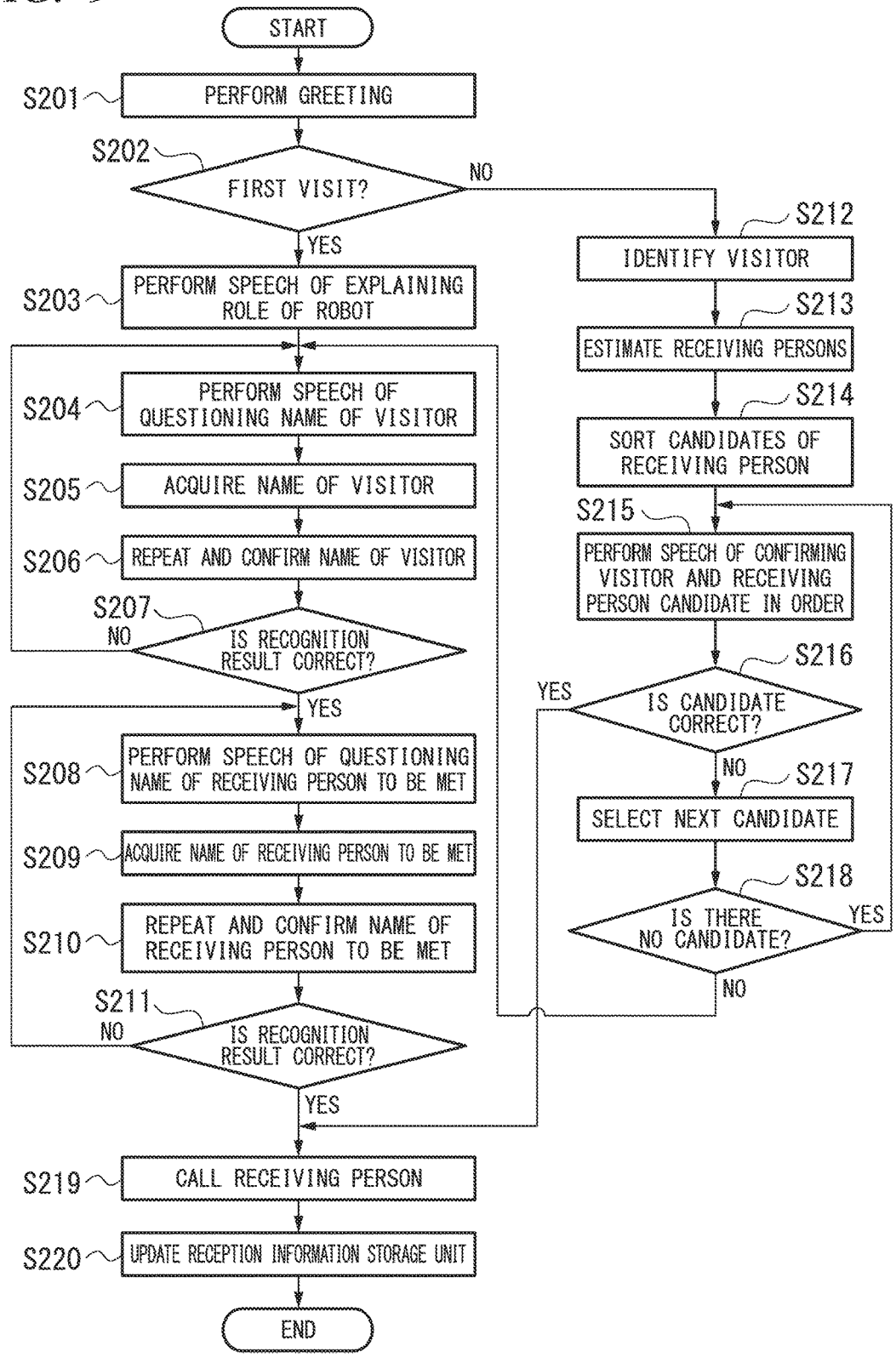

FIG. 10 g201

VISIT HISTORY

| VISITOR | VISITED PERSON | DATE |
|---|---|---|
| XX ELECTRONICS MR. TANAKA | SECOND DEVELOPMENT DIVISION TARO SUZUKI | 2016/1/10 |
| XX ELECTRONICS MR. TANAKA | FIRST DEVELOPMENT DIVISION ZIRO MIYAKE | 2016/1/9 |
| XX ELECTRONICS MR. TANAKA | DEVELOPMENT CENTER DAICHI KOBAYASHI | 2016/1/8 | g202

VISIT HISTORY

| VISITOR | VISITED PERSON | DATE | NUMBER OF TIMES OF VISIT |
|---|---|---|---|
| XX ELECTRONICS MR. TANAKA | FIRST DEVELOPMENT DIVISION ZIRO MIYAKE | 2016/1/9 | SEVEN TIMES |
| XX ELECTRONICS MR. TANAKA | DEVELOPMENT CENTER DAICHI KOBAYASHI | 2016/1/8 | FIVE TIMES |
| XX ELECTRONICS MR. TANAKA | SECOND DEVELOPMENT DIVISION TARO SUZUKI | 2016/1/10 | ONCE |

FIG. 11

R41 — ROBOT "HELLO, MR. TANAKA. ARE YOU HERE TO VISIT MR. SUZUKI OF SECOND DEVELOPMENT DIVISION?"

H41 — CUSTOMER "NO."

R42 — ROBOT "ARE YOU HERE TO VISIT MR. MIYAKE OF FIRST DEVELOPMENT DIVISION?"

H42 — CUSTOMER "YES."

R43 — ROBOT "I'M CALLING MR. MIYAKE. PLEASE WAIT."

R44 — ROBOT "PHONE CALL IS CONNECTED. PLEASE WAIT ON SOFA UNTIL MR. MIYAKE ARRIVES."

RECEPTION SYSTEM AND RECEPTION METHOD

CROSS-REFERENCE TO RELATED APPLICATION

Priority is claimed on Japanese Patent Application No. 2016-066568, filed on Mar. 29, 2016, the contents of which are incorporated herein by reference.

BACKGROUND

Field of the Invention

The present invention relates to a reception system and a reception method.

Background

Speech interaction systems are required which perform speech recognition with respect to speech contents of a user and perform a process by using the speech recognition result. Recently, humanoid robots start to be adopted, for example, for receptions of a company, a hotel, and the like. For example, Japanese Patent No. 4594857 discloses a reception system in which, when a visitor visits a company and the like, a robot questions the name and affiliation of the visitor, further questions a receiving person whom the visitor wants to meet, and notifies a required receiving person of a visit of the visitor.

SUMMARY

In the reception system using a robot, the robot questions the name of a visitor, the name of a receiving person, and the like every time the visitor visits. In this case, it is redundant for the visitor to be required to say the same answer each time. An object of an aspect of the present invention is to provide a reception system and a reception method capable of simplifying a redundant reception service.

(1) A reception system according to an aspect of the present invention includes: an imaging unit that captures an image; a reception information storage unit that stores an image of a visitor who visited in the past and information of a receiving person whom the visitor visited in the past in an associated manner; and an action performing unit that generates a question to the visitor based on a scenario regarding a response to the visitor and acquires information via a response to the question from the visitor, wherein the action performing unit changes a response presented to the visitor based on the scenario depending on whether or not the reception information storage unit stores an image that corresponds to the image captured by the imaging unit.

(2) The above reception system may include: a notification unit that notifies a receiving person whom the visitor wants to meet of a visit of the visitor, wherein the action performing unit may select a receiving person that corresponds to the visitor based on information of a receiving person stored by the reception information storage unit whom the visitor visited without making a question for acquiring information regarding the visitor to the visitor when the reception information storage unit stores an image that corresponds to the image captured by the imaging unit, and wherein the notification unit may notify the receiving person selected by the action performing unit of a visit of the visitor.

(3) In the above reception system, the action performing unit may make a question for acquiring information of the visitor and information of the receiving person to the visitor using a speech signal in accordance with the scenario when the reception information storage unit does not store an image that corresponds to the image captured by the imaging unit and may select a receiving person that corresponds to the visitor based on a result of performing speech recognition with respect to a speech signal of a response to the question.

(4) In the above reception system, the action performing unit may store a history of visit of the visitor in the past in the reception information storage unit with respect to the visitor, may select a candidate of the receiving person based on the history stored by the reception information storage unit when the reception information storage unit stores an image that corresponds to the image captured by the imaging unit, may present, when the number of the selected candidate of the receiving person is two or more, the plurality of the receiving persons as a candidate to the visitor by using a speech signal, and may select a receiving person that corresponds to the visitor based on a result of performing speech recognition with respect to a speech signal of a response to the question.

(5) In the above reception system, the action performing unit may store a history of visit of the visitor in the past in the reception information storage unit with respect to the visitor, may select a candidate of the receiving person based on the history stored by the reception information storage unit when the reception information storage unit stores an image that corresponds to the image captured by the imaging unit, and may present, when the number of the selected receiving person is two or more, the plurality of the receiving persons as a candidate to the visitor by using an image.

(6) In the above reception system, the action performing unit may present a candidate of the receiving person in the order of most to least of the number of times of visit when the number of the selected candidate of the receiving persons is two or more.

(7) In the above reception system, the action performing unit may present a candidate of the receiving person in the order of latest to earliest of visit when the number of the selected candidate of the receiving persons is two or more.

(8) The above reception system may include: a detection unit that detects a travel direction of the receiving person, wherein the action performing unit may change a response presented to the visitor based on at least one of a travel direction of the visitor detected by the detection unit and a travel direction obtained by detecting a travel direction of the receiving person from the image captured by the imaging unit.

(9) A reception method according to another aspect of the present invention includes: (a) by way of an imaging unit, capturing an image; (b) by way of an action performing unit, storing an image of a visitor who visited in the past and information of a receiving person whom the visitor visited in the past in an associated manner in a reception information storage unit; and (c) by way of the action performing unit, changing a response presented to the visitor based on a scenario regarding a response to the visitor depending on whether or not the reception information storage unit stores an image that corresponds to the image captured in (a).

According to the configuration (1) or (9) described above, the response presented to a visitor based on the scenario is changed based on the captured image, and therefore, it is possible to simplify a redundant reception service.

According to the configuration (2) described above, it becomes unnecessary to question, to a visitor who has visited a plurality of times, the affiliation and name of the visitor each time, and therefore, it is possible to reduce a load of the visitor.

According to the configuration (3), (4), (6), or (7) described above, a candidate of the receiving person is presented to the visitor based on reception history, and therefore, it is possible to increase a probability that the candidate becomes a receiving person desired by the visitor.

According to the configuration (5) described above, the visitor can see a list display of the receiving person and can easily select a desired receiving person.

According to the configuration (8) described above, the response is changed in accordance with the travel direction of the visitor, and therefore, it is possible to simplify a redundant reception service.

BRIEF DESCRIPTION OF THE DRAWINGS

FIG. 4 is a view for describing the example of the configuration of the database included in the reception information storage unit according to the first embodiment.

FIG. 6 is a view showing a specific example of the reception operation of the reception system when recognition succeeds in a case where a visitor visits for the first time according to the first embodiment.

FIG. 7 is a view showing a specific example of the reception operation of the reception system when false recognition occurs in a case where a visitor visits for the first time according to the first embodiment.

FIG. 9 is a flowchart showing a reception operation of a reception system according to a second embodiment.

FIG. 10 is a view for describing an operation at the reception system according to the second embodiment.

FIG. 11 is a view for describing the operation at the reception system according to the second embodiment.

DESCRIPTION OF THE EMBODIMENTS

Hereinafter, embodiments of the present invention are described with reference to the drawings.
<Overview of Reception System>

First, an overview of a reception system in the present embodiment is described.

Figure 1:
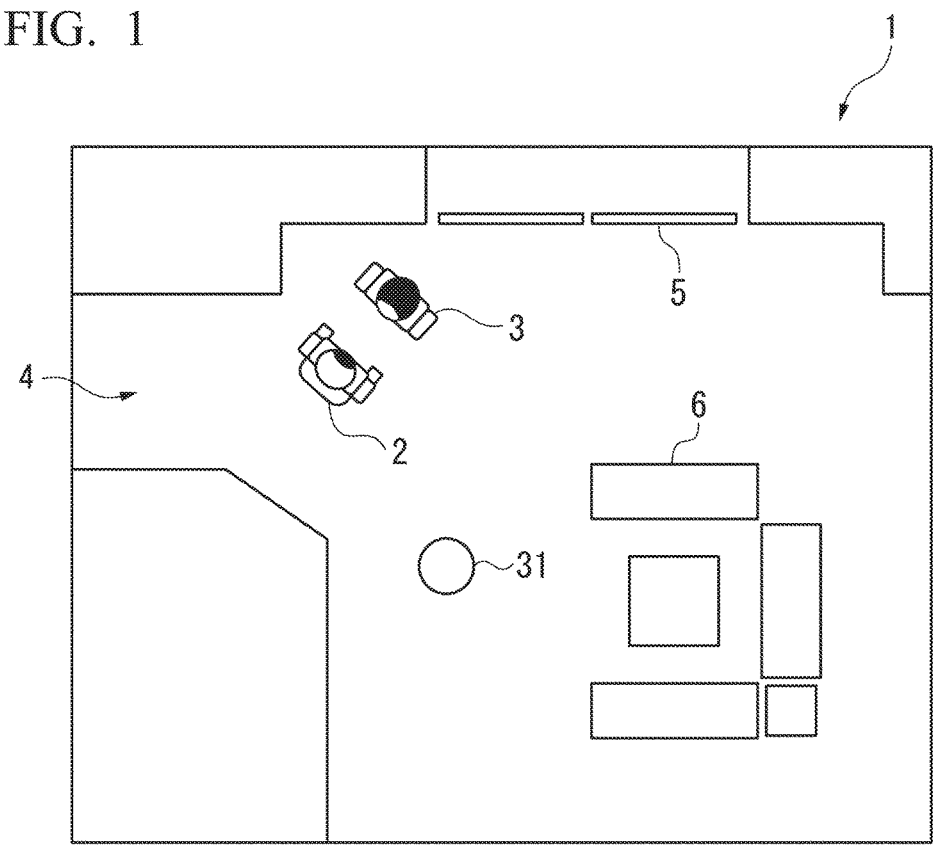
FIG. 1 is an image view of a reception system according to an embodiment.

FIG. 1 is an image view of a reception system 1 according to the present embodiment.

As shown in FIG. 1, in the reception system 1, a humanoid robot 2 (hereinafter, also referred to as a robot 2) performs a reception service to a visitor (customer) 3 who visits a company and the like.

The visitor 3 enters a room 4 from a door 5. The robot 2 stands by in the room 4.

A sofa 6 on which the visitor 3 can wait is provided in the room 4. A sensor 31 that detects a visitor is attached to a ceiling of the room 4. When the visitor 3 enters the room 4, and the visitor 3 is detected by the sensor 31, the robot 2 greets the visitor 3.

The robot 2 greets the visitor 3 and determines whether or not the visitor 3 is a visitor of the first time by performing image recognition to an image obtained by capturing a region including the face of the visitor 3. That is, the robot 2 stores an image of a visitor and information of the visitor in an associated manner as visitor history. The robot 2 performs face recognition of the face image of the current visitor 3 by using the face image registered on the visitor history. When the face image of the current visitor 3 cannot be searched from the face image registered on the visitor history, the robot 2 determines that the current visitor 3 is a visitor of the first time.

When the visitor 3 is a visitor of the first time, the robot 2 greets the visitor and then explains the role of the robot 2. Then, the robot 2 questions the name of the visitor 3, hears the name of the visitor 3, repeats the name of the visitor 3 for confirmation, and acquires information of the visitor 3. Then, the robot 2 questions a visited receiving person, hears the name of the visited receiving person from the visitor 3, repeats the name of the visited receiving person for confirmation, and acquires information of the visited receiving person. Then, the robot 2 connects a telephone at the contact number of the visited receiving person and contacts the receiving person to report that a visitor is present.

When the visitor 3 is a visitor of the second time or more, the robot 2 performs face recognition of the visitor 3 and acquires information of the visitor 3. Then, after greeting the visitor, the robot 2 skips a process of explaining the role of the robot 2, a process of questioning the name of the visitor 3, and a process of questioning the visited receiving person. Then, the robot 2 estimates the name of the visitor 3 and the visited receiving person based on the history of the past. Then, the robot 2 confirms whether the estimated visited receiving person is correct, connects a telephone at the contact number of the visited receiving person, and contacts the receiving person to report that a visitor is present.

In this way, in the reception system 1 according to the embodiment of the present invention, when the visitor 3 is a visitor of the second time or more, it is possible to skip the process of explaining the role of the robot 2, the process of questioning the name of the visitor 3, and the process of questioning the visited receiving person, and therefore, it is possible to simplify a redundant reception service.

First Embodiment

Next, the reception system 1 according to the present embodiment is described.

Figure 2:
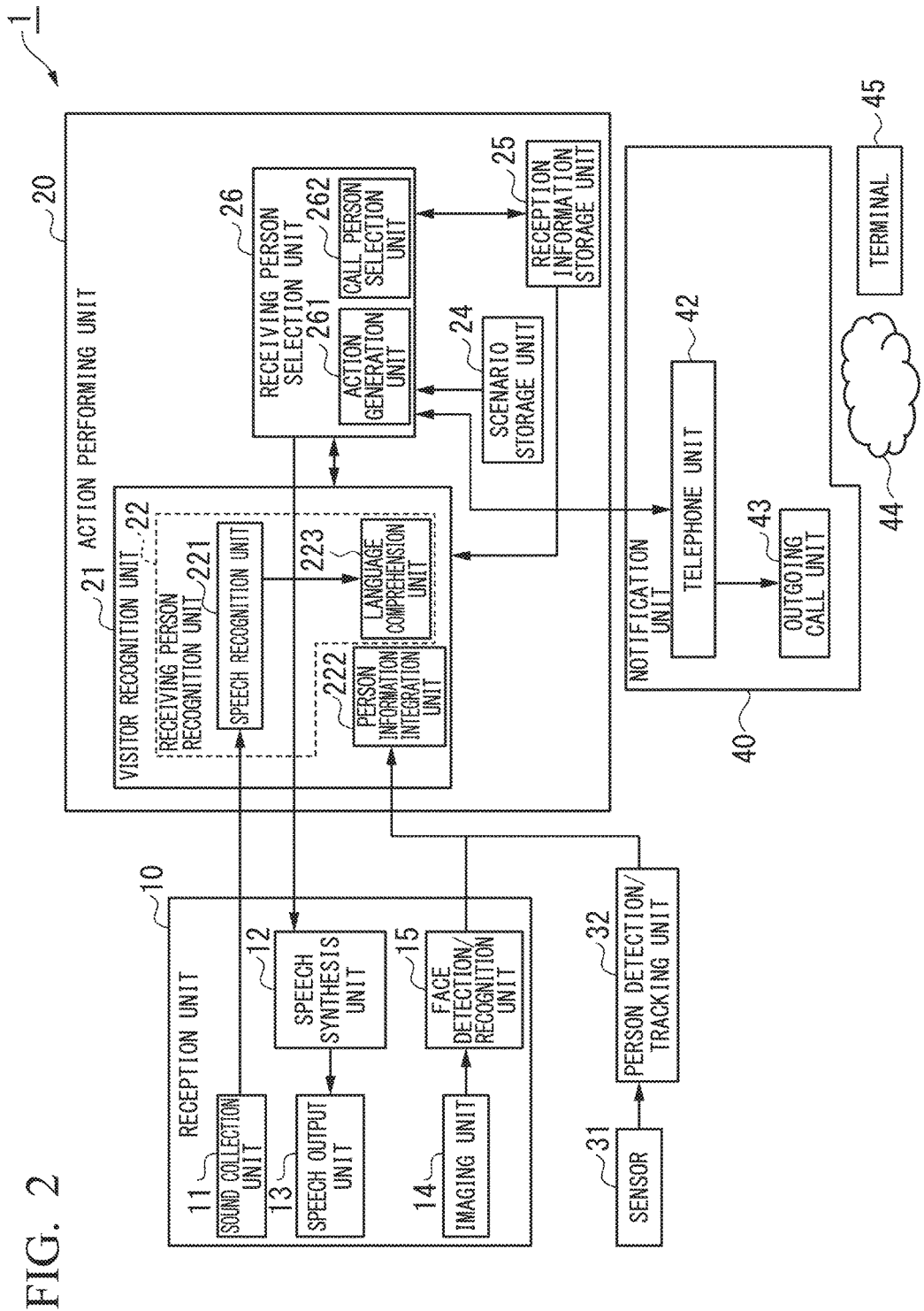
FIG. 2 is a block diagram showing a schematic configuration of a reception system according to a first embodiment.

FIG. 2 is a block diagram showing a schematic configuration of the reception system 1 according to the present embodiment. As shown in FIG. 2, the reception system 1 includes a reception unit 10, an action performing unit 20, a sensor 31, a person detection/tracking unit 32, a notification unit 40, and a terminal 45.

The reception unit 10 includes a sound collection unit 11, a speech synthesis unit 12, a speech output unit 13, an imaging unit 14, and a face detection/recognition unit 15.

The action performing unit 20 includes a visitor recognition unit 21, a receiving person recognition unit 22, a scenario storage unit 24, a reception information storage unit 25, and a receiving person selection unit 26. The visitor recognition unit 21 includes a speech recognition unit 221, a person information integration unit 222, and a language comprehension unit 223. The receiving person recognition unit 22 includes the speech recognition unit 221 and the language comprehension unit 223. The receiving person selection unit 26 includes an action generation unit 261 and a call person selection unit 262.

The notification unit 40 includes a telephone unit 42 and an outgoing call unit 43. The notification unit 40 and the terminal 45 are connected to each other via a network 44.

The reception unit 10 is, for example, the humanoid robot 2. The reception unit 10 acquires speech of a visitor and outputs the acquired speech to the action performing unit 20. The reception unit 10 captures an image of a region that includes the face of the visitor, extracts an image of the face from the captured image, and outputs the extracted result to the action performing unit 20. The reception unit 10 converts speech information output by the action performing unit 20 into a speech signal and outputs the converted speech signal. The speech information includes greeting a visitor, explaining the role of the reception system 1, identifying a visitor, confirming the name of a receiving person, announcement of calling a receiving person, and the like. The reception unit 10 may include at least one of the action performing unit 20 and the notification unit 40. The reception unit 10 may not form a humanoid robot and may include the configuration of the reception unit 10.

The sound collection unit 11 is, for example, a microphone array that includes N (N is an integer equal to or more than two) or more microphones. The sound collection unit 11 converts a collected speech signal into an electric signal and outputs the converted speech signal to the speech recognition unit 221. The sound collection unit 11 may transmit a collected N channel speech signal to the speech recognition unit 221 in a wireless manner or in a wired manner. The speech signal may be synchronized between channels when being transmitted.

The speech synthesis unit 12 converts the speech information output by the action performing unit 20 into a speech signal and outputs the converted speech signal to the speech output unit 13.

The speech output unit 13 is, for example, a speaker. The speech output unit 13 produces the speech signal output by the speech synthesis unit 12.

The imaging unit 14 is, for example, a camera that uses a CCD (Charge Coupled Device) image sensor. The imaging unit 14 captures an image, for example, at a predetermined interval and outputs the captured image to the face detection/recognition unit 15. The predetermined interval is, for example, an interval of 5 seconds.

The face detection/recognition unit 15 detects and recognizes an image of a human face from the image output by the imaging unit 14 by using, for example, a Viola & Johns method (refer to Paul Viola and Michael J. Jones. Rapid Object Detection using a Boosted Cascade of Simple Features. IEEE CVPR, 2001.). The face detection/recognition unit 15 outputs information indicating the detected and recognized result to the person information integration unit 222. The information output by the face detection/recognition unit 15 includes an image (hereinafter, also referred to as a face image) that includes the face of the visitor.

The sensor 31 is, for example, a plurality of LRF (Laser Range Finder) sensors provided on a ceiling. The LRF sensor is a three-dimensional area measurement sensor that scans a detection target space at a predetermined pitch while irradiating the space with laser light and that measures a time until the laser light is reflected by an object and returns to thereby detect the distance and direction to the object. The LRF sensor measures information of a distance measurement point including the detected distance and direction to the object and outputs the measured information of the distance measurement point to the person detection/tracking unit 32. The information of the distance measurement point includes an x-axis component, a y-axis component, and a z-axis component. The plurality of LRF sensors are arranged at a position where it is possible to look down on a person, for example, on a ceiling, a wall, or the like of the detection target space such that the detection target spaces are partially overlapped with each other. The present embodiment is described using an example in which the LRF sensor is used as an example of the sensor 31; however, the sensor is not limited thereto. The sensor may be another sensor.

The person detection/tracking unit 32 uses the information of the distance measurement point output by the sensor 31 and classifies the distance measurement point into cluster data at a predetermined period, for example, using a hierarchical method such as the shortest distance method.

The person detection/tracking unit 32 calculates a centroid position of each classified cluster and treats the calculated centroid position as information indicating the position of the visitor. The person detection/tracking unit 32 integrates the classified cluster data. The person detection/tracking unit 32 allocates an identifier (ID) for each person by using the integrated cluster data. The person detection/tracking unit 32 performs tracking with respect to person cluster data for which the ID is allocated. The tracking is performed, for example, by using a result of classification of a projected point of the distance measurement point on the xy plane and the centroid position of the cluster. The person detection/tracking unit 32 outputs the information indicating the detected and tracked result to the person information integration unit 222.

The speech recognition unit 221 performs a sound source localization process, a noise suppression process, a speech zone detection process, a sound source separation process, and a speech recognition process with respect to the speech signal output by the sound collection unit 11. The speech recognition unit 221 calculates a spatial spectrum indicating a power of each direction by using a transfer function stored by the speech recognition unit 221, for example, using a multiple signal classification (MUSIC) method with respect to the N channel speech signal output by the sound collection unit 11.

The speech recognition unit 221 determines a sound source direction of each sound source based on the spatial spectrum. The speech recognition unit 221 suppresses reverberation, for example, using a reverse filter process of an in-room impulse response.

The speech recognition unit 221 detects a speech zone, for example, by using a threshold value stored by the speech recognition unit 221 and extracts the N channel speech signal and sound source direction information in the speech zone detected from the N channel speech signal. The speech recognition unit 221 separates the N channel speech signal into sound source-specific speech signals as a speech signal of each sound source based on the sound source directions indicated by the sound source direction information by using, for example, a geometric-constrained high-order decorrelation-based source separation (GHDSS) method.

The speech recognition unit 221 outputs the recognized result to the language comprehension unit 223.

The person information integration unit 222 acquires information indicating the detected and recognized result output by the face detection/recognition unit 15 and information indicating the detected and tracked result output by the person detection/tracking unit 32 and integrates the acquired information.

The language comprehension unit 223 calculates a speech feature quantity of the separated speech signal of the frame with respect to the recognized result output by the speech recognition unit 221. The language comprehension unit 223 performs a language comprehension process by using the calculated speech feature quantity and a speech recognition model stored by the language comprehension unit 223. The language comprehension unit 223 determines a word having the highest likelihood calculated by using the speech recognition model as a recognition result for the calculated speech feature quantity. The language comprehension unit 223 generates text data representing the recognition result as the speech contents of each sound source. The language comprehension unit 223 performs a dependency parsing with respect to the text data and extracts a noun.

When a person is recognized in a predetermined range of the reception unit 10 for a predetermined time or more based on the information integrated by the person information integration unit 222, the visitor recognition unit 21 determines that a person is present in front of the reception unit 10 and outputs visit information indicating a visit of a person to the receiving person selection unit 26. The receiving person selection unit 26 determines whether or not a person is present in front of the reception unit 10 by using at least one of a result detected by the LRF sensor 31 and the image captured by the imaging unit 14. The visitor recognition unit 21 determines whether or not the face image acquired by the person information integration unit 222 is stored in the reception information storage unit 25, for example, by using a pattern matching method. The visitor recognition unit 21 outputs a determined result to the receiving person selection unit 26. The determined result includes information indicating that the face image is stored in the reception information storage unit 25 or information indicating that the face image is not stored in the reception information storage unit 25. When the face image is stored in the reception information storage unit 25, the visitor recognition unit 21 searches a database stored by the reception information storage unit 25 and extracts at least a noun indicating the name of the visitor. The visitor recognition unit 21 may also search a noun indicating the affiliation (company name, department name, and the like) of the visitor, the number of times of visit, and the like.

When the action generation unit 261 starts to produce the speech information indicating questioning about the purpose for visiting, the visitor recognition unit 21 extracts a noun indicating the affiliation of the visitor (company name, department name, and the like) and a noun indicating the name of the visitor with respect to the noun of the text data recognized by the language comprehension unit 223 by searching the database stored by the reception information storage unit 25. The visitor recognition unit 21 outputs the extracted noun indicating the affiliation of the customer and the extracted noun indicating the name of the customer to the receiving person selection unit 26.

When the action generation unit 261 starts to produce the speech information indicating questioning about the purpose for visiting, the receiving person recognition unit 22 extracts a noun excluding the noun indicating the affiliation of the customer and the noun indicating the name of the customer, from the noun of the text data. The receiving person recognition unit 22 extracts a noun indicating the affiliation of the receiving person and a noun indicating the name of the receiving person with respect to the extracted noun with reference to a staff member database stored by the reception information storage unit 25. The receiving person recognition unit 22 outputs the extracted noun indicating the affiliation of the receiving person and the extracted noun indicating the name of the receiving person to the receiving person selection unit 26.

The scenario storage unit 24 stores a response scenario to a visitor. The response scenario to a visitor is, for example, a text file including greeting a visitor, explaining the role of the reception system 1, identifying a visitor, confirming the name of a receiving person, announcement of calling a receiving person, and the like and which includes the order thereof. In the scenario, information indicating whether or not questioning or response is performed depending on the number of times of visit of a visitor is associated with each question or each response.

The reception information storage unit 25 stores a staff member database, a visit history database, and the like. Information stored by the reception information storage unit 25 is described below.

When the receiving person selection unit 26 recognizes that a person is present in front of the reception unit 10, the receiving person selection unit 26 generates an action based on the scenario stored by the scenario storage unit 24. The receiving person selection unit 26 acquires the determined result output by the visitor recognition unit 21. When the acquired determination result is information indicating that the face image is stored in the reception information storage unit 25, in accordance with the scenario stored by the scenario storage unit 24, the receiving person selection unit 26 skips questioning about the purpose for visiting (the affiliation and name of the visitor, the name of the receiving person) to the visitor and selects a receiving person from the information stored by the reception information storage unit 25. The receiving person selection unit 26 extracts a phone number that corresponds to the receiving person by searching the reception information storage unit 25 and outputs the extracted phone number to the notification unit 40.

When the visitor recognition unit 21 recognizes that a person is present in front of the reception unit 10, the action generation unit 261 generates an action based on the scenario stored by the scenario storage unit 24.

When the determined result output by the visitor recognition unit 21 is information indicating that the face image is stored in the reception information storage unit 25, the action generation unit 261 determines that the visitor 3 is a visitor of the second time or more. In this case, the action generation unit 261 associates a command of selecting a receiving person in response to a result recognized by the visitor recognition unit 21 with information indicating that the visitor is a visitor of the second time or more, and outputs the command to the call person selection unit 262. The action generation unit 261 outputs speech for confirming the receiving person selected by the call person selection unit 262 and speech for confirming the name of the recognized visitor. Then, when the action generation unit 261 can confirm that the name of the visitor and the name of the receiving person are correct, the action generation unit 261 generates an action such that the phone is connected to the receiving person.

When the determined result output by the visitor recognition unit 21 is information indicating that the face image is not stored in the reception information storage unit 25, the action generation unit 261 determines that the visitor 3 is a visitor of the first time. In this case, the action generation unit 261 selects a text file of greeting a visitor and explaining the role of the reception system 1 from the scenario and outputs the selected text file to the speech synthesis unit 12. The action generation unit 261 selects a text file indicating questioning about the purpose for visiting from the scenario, outputs the selected text file to the speech synthesis unit 12, and outputs, to the visitor recognition unit 21 and the receiving person recognition unit 22, information indicating that the text file indicating questioning about the purpose for visiting has been output.

When the visitor recognition unit 21 outputs the noun of the affiliation and name of the visitor, and the receiving person recognition unit 22 outputs the noun of the affiliation and name of the receiving person, the action generation unit 261 outputs a command of selecting the receiving person in association with the information indicating that the visitor is a visitor of the first time to the call person selection unit 262. When the visitor recognition unit 21 outputs the noun of the affiliation and name of the visitor, and the receiving person recognition unit 22 outputs the noun of the affiliation and name of the receiving person, the action generation unit 261 may select a text file of confirming the matter from the scenario and may output the selected text file to the speech synthesis unit 12. When the call person selection unit 262 outputs information indicating that the receiving person is absent and information indicating that a substitute receiving person is being called, the action generation unit 261 may select a text file indicating that the receiving person is absent and indicating that a substitute receiving person is being called from the scenario and may output the selected text file to the speech synthesis unit 12. When phone response availability information output by the telephone unit 42 includes information indicating that there has been a response, the action generation unit 261 may select a text file indicating that the calling has been performed from the scenario and may output the selected text file to the speech synthesis unit 12.

When the call person selection unit 262 acquires the information indicating that the visitor is a visitor of the second time or more from the action generation unit 261, the call person selection unit 262 extracts a candidate of a receiving person with reference to the information stored by the reception information storage unit 25 by using the name of the visitor and outputs information indicating the extracted receiving person to the action generation unit 261.

When the call person selection unit 262 acquires the information indicating that the visitor is a visitor of the first time from the action generation unit 261, the call person selection unit 262 acquires the noun of the affiliation and name of the receiving person output by the receiving person recognition unit 22 and selects the acquired receiving person.

Further, the call person selection unit 262 extracts a phone number that corresponds to the selected receiving person with reference to the reception information storage unit 25 and outputs the extracted phone number to the notification unit 40.

The network 44 is a network such as a telephone communication line, the Internet line, and a wireless line.

The notification unit 40 acquires the phone number output by the receiving person selection unit 26 and calls a terminal 45 that corresponds to the acquired phone number. The notification unit 40 generates phone response availability information indicating whether or not there has been a response to the phone and outputs the generated phone response availability information to the action generation unit 261.

The telephone unit 42 acquires the phone number of the receiving person output by the receiving person selection unit 26 and controls the outgoing call unit 43 to call the terminal 45 that corresponds to the acquired phone number of the receiving person. The telephone unit 42 generates phone response availability information indicating whether or not there has been a response of the receiving person in a predetermined time and outputs the generated phone response availability information to the action generation unit 261. The telephone unit 42 may determine that there has been no response of the receiving person when connection is made but the call is connected to an answering machine and the like. In this case, the telephone unit 42 may determine whether the call is connected to the answering machine or is connected to the receiving person by performing a speech recognition process.

The outgoing call unit 43 calls the terminal 45 via the network 44 in response to the control of the telephone unit 42.

The terminal 45 is a telephone set for which a phone number is allocated for each receiving person. The terminal 45 is, for example, a mobile phone. The terminal 45 may be a telephone set in use for an extension phone used in a company and the like.

Figure 3:
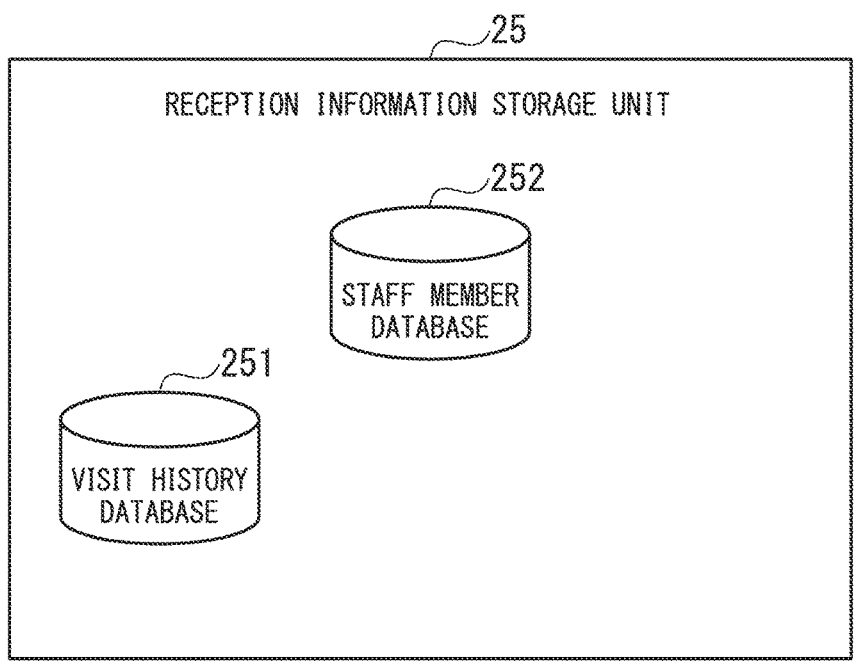
FIG. 3 is a view showing an example of a configuration of a database included in a reception information storage unit according to the first embodiment.

FIG. 3 and FIG. 4 are views showing an example of a configuration of a database included in the reception information storage unit 25 according to the first embodiment. As shown in FIG. 3, the reception information storage unit 25 includes a visit history database 251 and a staff member database 252.

As shown in a table g101 of FIG. 4, the visit history database 251 stores a visit date (visit history), the name of a visitor, the face image of the visitor, the affiliation of the visitor, the name of a receiving person, and the affiliation of the receiving person in an associated manner. The visit history database 251 is updated at each time when a visitor visits. As shown in a table g102 of FIG. 4, the staff member database 252 stores the name of a staff member, the affiliation of the staff member, and a contact phone number in an associated manner. The visit history database 251 is updated by at least one of the action performing unit 20 and the notification unit 40 at each phone calling or receiving.

The database provided at the reception information storage unit 25 is not limited thereto. The reception information storage unit 25 may further store information of attending or leaving work of a staff member, schedule information of the staff member, meeting schedule information, business relationship information, staff member information of a related company, and the like.

Next, a reception operation of the reception system 1 according to the present embodiment is described. First, a common reception operation for a case in which the visitor 3 visits for the first time and for a case in which the visitor 3 visits for the second time or more is described with reference to FIG. 2 and FIG. 4.

When the visitor 3 is detected according to a detection signal of the sensor 31, the action generation unit 261 outputs, to the speech synthesis unit 12, speech for greeting a visitor as a visiting customer. Thereby, speech for greeting is output from the speech output unit 13.

The imaging unit 14 captures an image including the face of the visitor. The face detection/recognition unit 15 performs face recognition of the visitor. As shown in the table g101 of FIG. 4, the visit history database 251 stores the face image of the visitor. The visitor recognition unit 21 selects the visitor 3 by performing matching calculation between the face image of the visitor 3 detected and recognized by the face detection/recognition unit 15 and the face image stored by the visit history database 251. When an image matched with the face image of the visitor 3 detected and recognized by the face detection/recognition unit 15 cannot be searched in the visit history database 251, the visitor recognition unit 21 determines that the visitor 3 is a visitor of the first time.

Next, a process sequence of the reception system 1 is described.

Figure 5:
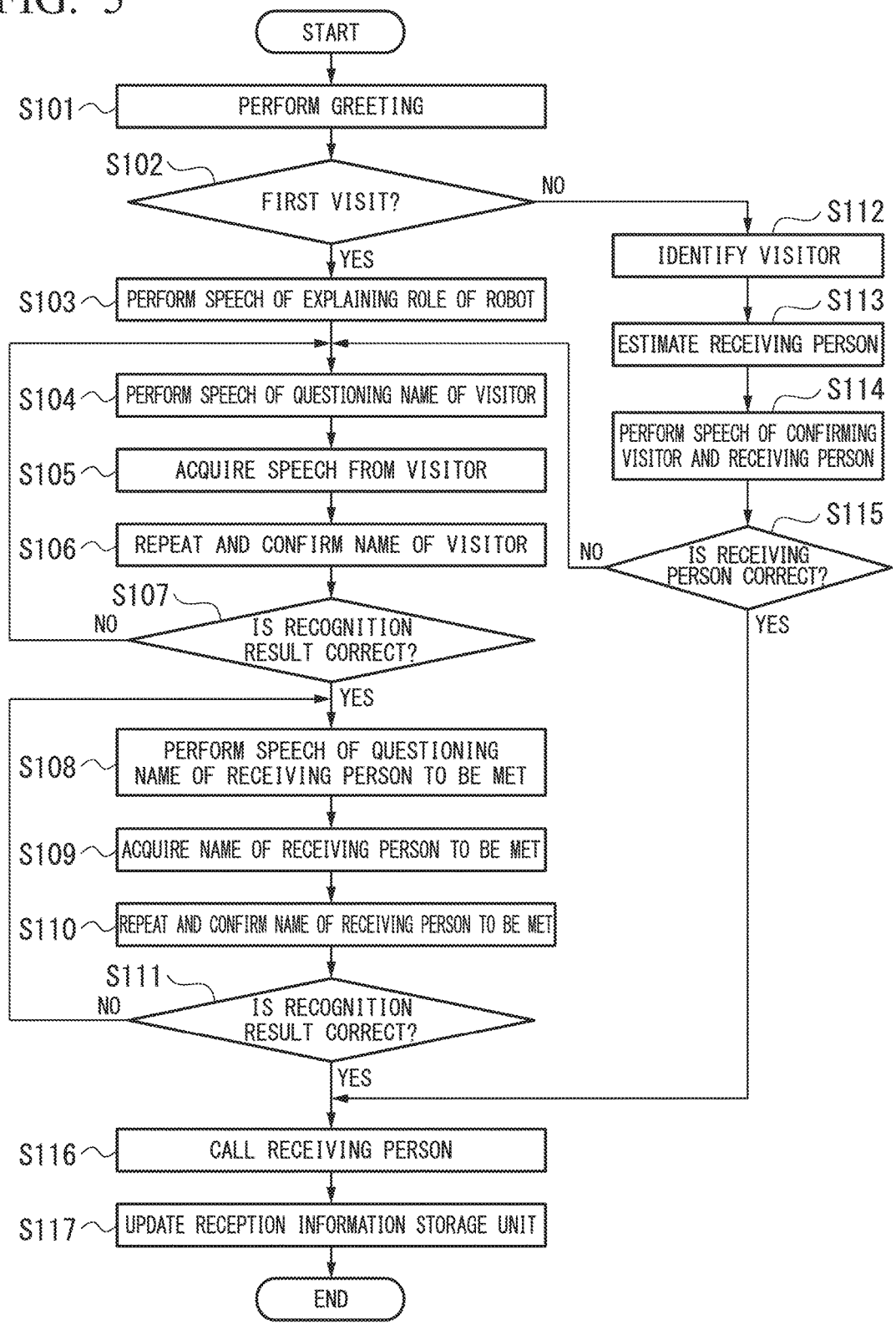
FIG. 5 is a flowchart showing a reception operation of the reception system according to the first embodiment.

FIG. 5 is a flowchart showing a reception operation of the reception system 1 according to the present embodiment.

(Step S101) The visitor recognition unit 21 determines that a person is present in front of the reception unit 10 when a person is recognized in a predetermined range of the reception unit 10 for a predetermined time or more based on the information integrated by the person information integration unit 222. When it is determined that a person is present in the predetermined range of the reception unit 10, the action generation unit 261 outputs speech information for producing greeting to the speech synthesis unit 12 and produces greeting from the speech output unit 13. Subsequently, the imaging unit 14 captures an image of a region that includes the face of the visitor 3 (imaging step).

(Step S102) The visitor recognition unit 21 determines whether or not the visit of the visitor 3 is a visit of the first time according to whether or not the face image acquired by the person information integration unit 222 is stored in the reception information storage unit 25, for example, using a pattern matching method. The visitor recognition unit 21 causes the process to proceed to Step S103 when it is determined that the visit of the visitor 3 is a visit of the first time (Step S102; YES) and causes the process to proceed to Step S112 when it is determined that the visit of the visitor 3 is not a visit of the first time (Step S102; NO). That is, in the present embodiment, a response to the visitor 3 is changed based on the number of times of visit of the visitor 3 (change step).

(Step S103) The action generation unit 261 outputs speech information of explaining the role of the robot 2 (FIG. 1) (the reception unit 10) to the speech synthesis unit 12 and produces speech of explaining the role of the robot 2 from the speech output unit 13 in accordance with the scenario stored by the scenario storage unit 24.

(Step S104) The action generation unit 261 outputs speech information of questioning the name of the visitor 3 to the speech synthesis unit 12 in accordance with the scenario and thereby questions about the name of the visitor 3.

(Step S105) The sound collection unit 11 collects the speech signal spoken by the visitor 3. Subsequently, the speech recognition unit 221 performs speech recognition with respect to the speech signal of the visitor 3 collected by the sound collection unit 11.

Subsequently, the language comprehension unit 223 acquires the name of the visitor by performing a dependency parsing or the like with respect to the result of speech recognition by the speech recognition unit 221.

(Step S106) The action generation unit 261 outputs, to the speech synthesis unit 12, a text file for confirming the name of the visitor 3 in order to repeat the recognized name of the visitor 3 for confirmation in accordance with the scenario to thereby confirm the name of the visitor.

(Step S107) The visitor 3 performs speech indicating that the recognition result is correct or speech indicating that the recognition result is incorrect. The visitor recognition unit 21 performs speech recognition and language comprehension with respect to the speech signal collected by the sound collection unit 11 and determines whether or not the recognition result of the name of the visitor 3 is correct. For example, the visitor recognition unit 21 determines that the recognition result of the name of the visitor 3 is correct when the recognition result of the speech signal is "yes" and determines that the recognition result of the name of the visitor 3 is incorrect when the recognition result of the speech signal is "no". The visitor recognition unit 21 causes the process to proceed to Step S108 when it is determined that the recognition result of the name of the visitor 3 is correct (Step S107; YES) and causes the process to return to Step S104 when it is determined that the recognition result of the name of the visitor 3 is incorrect (Step S107; NO).

(Step S108) The action generation unit 261 outputs speech information of questioning the name of the receiving person to the speech synthesis unit 12 and thereby questions about the name of the receiving person.

(Step S109) The sound collection unit 11 collects the sound of the name of the receiving person spoken by the visitor 3. The receiving person recognition unit 22 performs speech recognition and language comprehension with respect to the speech signal collected by the sound collection unit 11 and acquires the name of the receiving person.

(Step S110) The action generation unit 261 outputs, to the speech synthesis unit 12, a text file for confirming the name of the receiving person in order to repeat the recognized speech for confirmation to thereby confirm the name of the receiving person.

(Step S111) The visitor 3 performs speech indicating whether or not the recognition result is correct. The receiving person recognition unit 22 performs speech recognition and language comprehension with respect to the speech signal collected by the sound collection unit 11 and determines whether or not the recognition result of the name of the receiving person is correct. The receiving person recognition unit 22 causes the process to proceed to Step S116 when it is determined that the recognition result of the name of the receiving person is correct (Step S111; YES) and causes the process to return to Step S108 when it is determined that the recognition result of the name of the receiving person is incorrect (Step S111; NO).

As described above, when the visit of the visitor 3 is a visit of the first time, the processes of Step S103 to Step S111 are performed.

(Step S112) When the face image is stored in the reception information storage unit 25, the visitor recognition unit 21 searches the database stored by the reception information storage unit 25 and extracts at least a noun indicating the name of the visitor to thereby identify the visitor.

(Step S113) The receiving person selection unit 26 selects a receiving person stored by the reception information storage unit 25 in association with the visitor and thereby estimates the receiving person.

(Step S114) The action generation unit 261 outputs the name of the visitor 3 and speech information for confirming the name of the estimated receiving person to the speech synthesis unit 12 and thereby confirms the name of the visitor 3 and the name of the receiving person. For example, when the number of the receiving person associated with the visitor stored by the reception information storage unit 25 is one, or when it is determined that the visitor meets only one receiving person in a predetermined duration (for example, half year) from the date of previous visit based on information stored by the reception information storage unit 25, the action generation unit 261 may cause the process to skip Step S114 and Step S115 and proceed to Step S116.

(Step S115) The visitor 3 performs speech indicating whether or not the estimated receiving person is correct. The receiving person recognition unit 22 performs speech recognition and language comprehension with respect to the speech signal collected by the sound collection unit 11 and determines whether or not the name of the visitor 3 and the name of the receiving person are correct. The receiving person recognition unit 22 causes the process to proceed to Step S116 when it is determined that the name of the visitor 3 and the name of the receiving person are correct (Step S115; YES) and causes the process to return to Step S104 when it is determined that the name of the visitor 3 and the name of the receiving person are incorrect (Step S115; NO).

As described above, in the present embodiment, when it is determined that the visit of the visitor 3 is not a visit of the first time in Step S102, the processes of Step S103 to Step S111 which are a process of explaining the role of the robot, a process of questioning the name of the visitor 3, and a process of questioning the name of the receiving person are skipped, and a receiving person is estimated from the history of the past of the visitor 3.

(Step S116) The receiving person selection unit 26 searches the phone number of the department to which the receiving person belongs by using the information of the staff member database 252 of the reception information storage unit 25. Subsequently, the telephone unit 42 calls the terminal 45 that corresponds to the phone number. When the visit of the visitor is a visit of the second time or more, and the call is received by the terminal 45 of the receiving person, the receiving person selection unit 26 generates a speech message indicating that the visitor 3 has arrived at the reception and transmits the generated speech message to the terminal 45. Alternatively, when the visit of the visitor 3 is a visit of the first time, and the call is received by the terminal 45 of the receiving person, the receiving person selection unit 26 transmits, to the terminal 45, a speech signal obtained by performing speech recognition with respect to a speech signal spoken by the visitor 3. The receiving person selection unit 26 may perform, for example, noise suppression on the speech signal obtained by performing speech recognition with respect to a speech signal spoken by the visitor and, based on a result of detecting a speech zone, may separate the speech for each speech zone. Thereby, the receiving person can easily hear the speech of the visitor 3.

(Step S117) The receiving person selection unit 26 writes history information regarding current visit on the visit history database 251 of the reception information storage unit 25. The visitor recognition unit 21 writes the name of the visitor 3 and the face image of the visitor 3 on the visit history database 251 when the visit of the visitor 3 is a visit of the first time (storing step).

Next, a specific example of the reception operation of the reception system 1 according to the present embodiment is described.

FIG. 6 is a view showing a specific example of the reception operation of the reception system 1 when recognition succeeds in a case where the visitor 3 visits for the first time according to the present embodiment. FIG. 7 is a view showing a specific example of the reception operation of the reception system 1 when false recognition occurs in a case where the visitor 3 visits for the first time according to the present embodiment.

As shown in FIG. 6, when the visitor 3 is the first customer, the robot 2 including the reception unit 10 outputs greeting speech R11 ("Hello.") and subsequent speech R12 ("This is the reception system. I (the reception system) will contact a staff member you would like to visit.") of explaining the role of the robot. Subsequently, the robot 2 outputs speech R13 ("Please tell me your name.") of asking for the name of the visitor. The robot 2 may include a motor, a sensor, a control unit, and the like (not shown) and may control the direction of the robot 2 or the direction of the face of the robot 2 to be directed to a position at which the visitor is present based on a result of image recognition or a result detected by the sensor 31.

The visitor 3 performs speech H11 ("My name is Tanaka.") regarding the name of the visitor in response to the speech of questioning the name of the visitor. The robot 2 outputs speech R14 ("Did you say Mr. Tanaka?") for repeat and confirmation in response to the speech H11 from the visitor 3. The visitor 3 performs speech H12 ("Yes.") indicating a positive answer in response to the speech R14 for repeat and confirmation.

If the robot 2 erroneously recognizes "Mr. Tanaka" as "Mr. Takenaka", as shown in FIG. 7, the robot 2 outputs speech R14A ("Did you say Mr. Takenaka?") for confirmation in response to the speech H11 from the visitor 3. The visitor 3 performs speech H12A ("No, I didn't.") indicating a negative answer in response to the speech R14A for confirmation. When the result of the repeat and confirmation of the name of the visitor 3 is negative, the robot 2 further outputs speech R13A ("I'm sorry. Could you tell me your name again.") of questioning the name of the visitor 3.

In FIG. 6, when the result of the repeat and confirmation of the name of the visitor 3 is positive, the robot 2 outputs speech R15 ("Please let me know the name of the person you are here to visit.") asking the name of the person to be met. The visitor 3 performs speech H13 ("I am here to see Mr. Miyake.") regarding the name of the person to be met in response to the speech R15 asking the name of the person to be met. The robot 2 outputs speech R16 ("Did you say you are here to see Mr. Miyake of the first development division?") for confirmation in response to the speech H13 regarding the name of the person to be met. The visitor 3 performs speech H14 ("Yes.") indicating a positive answer in response to the speech R16 for confirmation.

When the result of the confirmation of the name of the person to be met is positive, the robot 2 calls the department of "Mr. Miyake of the first development division" and performs speech R17 ("I'm calling Mr. Miyake. Please wait.") indicating that a phone call is currently being performed. The robot 2 transmits a speech message indicating that "Mr. Tanaka has arrived at the reception" to the called person. Then, when the phone call is connected, the robot 2 outputs speech R18 ("The phone call is connected. Please wait on the sofa until Mr. Miyake arrives.") indicating that the phone call connected.

If the phone call fails, as shown in FIG. 7, the robot 2 outputs speech R18A ("The phone call did not connected. I'm calling one of his co-workers.") indicating that the phone call did not connect.

Figure 8:
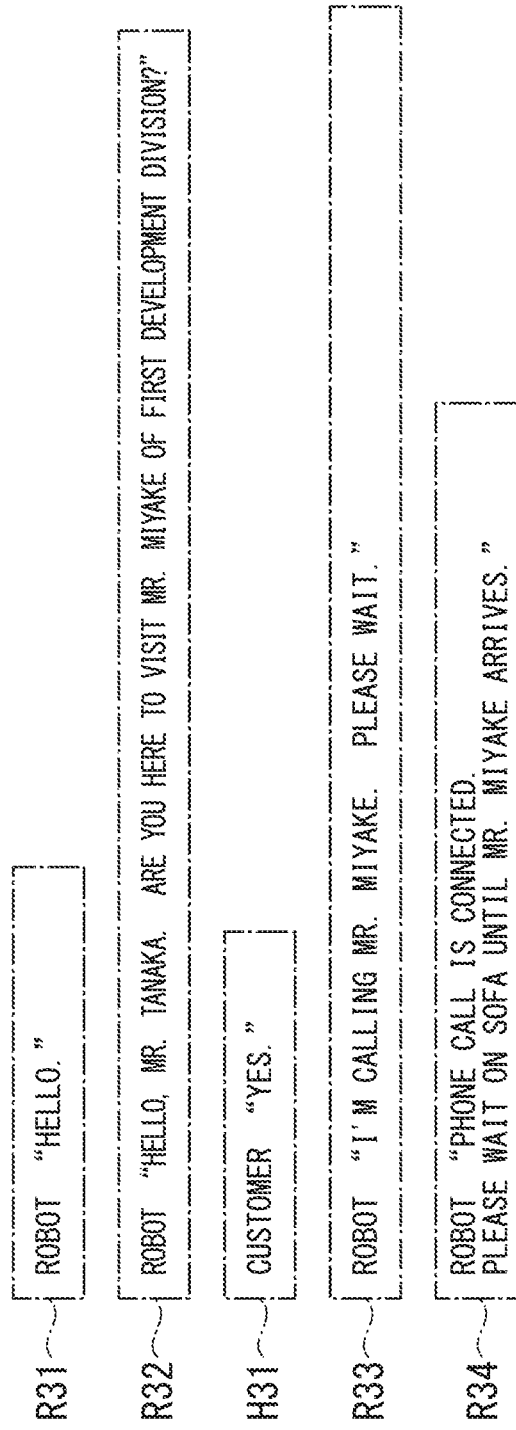
FIG. 8 shows a specific example of the reception operation of the reception system when the visitor is a visitor of the second time or more according to the first embodiment.

Next, a specific example of the reception operation of the robot 2 when the visitor 3 is a return visitor (second time or more) is described. FIG. 8 shows a specific example of the reception operation of the reception system 1 when the visitor 3 is a return visitor 3 according to the present embodiment.

As shown in FIG. 8, when the visitor 3 is a customer of the second time visit or more, the robot 2 outputs greeting speech R31 ("Hello."). Next, the robot 2 estimates the name of the visitor 3 and a candidate of a visited receiving person based on a facial image of the visitor 3 and a visit history. When it is estimated that the name of the visitor 3 is "Tanaka" and the visited person of the visitor 3 is "Miyake of the first development division", the robot 2 outputs speech R32 ("Hello, Mr. Tanaka. Are you here to visit Mr. Miyake of the first development division?") confirming the visitor and the receiving person.

The visitor 3 performs speech indicating whether or not the visited person is correct in response to the speech R32. The visitor 3 performs speech H31 ("Yes.") indicating a positive answer in response to the speech R32.

When the result of confirmation of the visitor 3 is positive, the robot 2 calls the department of "Mr. Miyake of the first development division" and outputs speech R33 ("I'm calling Mr. Miyake. Please wait.") indicating that a phone call is currently being performed. The robot 2 transmits a speech message indicating that "Mr. Tanaka has arrived at the reception desk" to the called person. Then, when the phone call is connected, the robot 2 outputs speech R34 ("The phone call is connected. Please wait on the sofa until Mr. Miyake arrives.") indicating that the phone call connected.

In this way, in the reception system 1 according to the embodiment of the present invention, when the visit of the visitor 3 is a visit of the first time, the robot 2 first outputs speech of explaining the role of the robot 2, outputs speech of questioning the name of the visitor, acquires the name from the visitor 3, outputs speech of questioning a visited receiving person, acquires the name of the visited receiving person from the visitor 3, and then connects a phone to the visited receiving person. In this scenario, the response can be easily understood by a customer as a visitor of the first time, and it is possible to handle a wide range of visitors.

On the other hand, when the visitor 3 is a visitor of the second time or more, the reception system 1 outputs speech of confirming the name of the visitor and a visited receiving person estimated based on the history of the past and, when confirmation is made, connects a phone to the visited receiving person. In this scenario, it is possible to skip the process of outputting speech of explaining the role of the robot 2, the process of outputting speech of questioning the name of the visitor 3, and the process of outputting speech of questioning the visited receiving person, and therefore, it is possible to simplify a redundant reception service.

Second Embodiment

Next, a second embodiment is described. The configuration of the reception system 1 according to the present embodiment is similar to that of the first embodiment described above, and description of the configuration is omitted.

As described above, in the first embodiment, when the visitor 3 is a visitor of the second time or more, the action performing unit 20 estimates the name of a visitor and a candidate of a visited receiving person estimated based on the history of the past. There may be a case in which the visitor 3 visited a plurality of receiving persons in the past. In the present embodiment, the action performing unit 20 can estimate a plurality of candidates of a visited receiving person based on history of the past, and a visited receiving person at this time can be selected from the plurality of candidates.

The receiving person selection unit 26 also performs the following process in addition to the process of the first embodiment. When there are a plurality of candidates of the receiving person, the receiving person selection unit 26 generates a question of allowing a visitor to select a receiving person from the plurality of candidates of the receiving person in accordance with the scenario and outputs a text file of the generated question to the speech synthesis unit 12. The receiving person selection unit 26 determines a receiving person according to a detection result by the speech recognition unit 221 and the language comprehension unit 223.

FIG. 9 is a flowchart showing a reception operation of the reception system 1 according to the present embodiment.

(Step S201) The reception system 1 performs a process of Step S201 similarly to Step S101 (FIG. 5) and causes the process to proceed to Step S202.

(Step S202) The visitor recognition unit 21 determines whether or not the visit of the visitor 3 is a visit of the first time according to whether or not the face image acquired by the person information integration unit 222 is stored in the reception information storage unit 25, for example, using a pattern matching method. The visitor recognition unit 21 causes the process to proceed to Step S203 when it is determined that the visit of the visitor 3 is a visit of the first time (Step S202; YES) and causes the process to proceed to Step S212 when it is determined that the visit of the visitor 3 is not a visit of the first time (Step S202; NO). That is, also in the present embodiment, similarly to the first embodiment, a response to the visitor 3 is changed based on the number of times of visit of the visitor 3 (change step).

(Step S203) The reception system 1 performs the processes of Step S203 to Step S211, similarly to the processes of Step S103 to Step S111 (FIG. 5) and causes the process to proceed to Step S219 when it is determined that the visit of the visitor 3 is a visit of the first time.

In this way, also in the present embodiment, similarly to the first embodiment, when it is determined that the visit of the visitor 3 is a visit of the first time in Step S202, a process of explaining the role of the robot is performed in Step S203, a process of questioning the name of the visitor 3 is performed in Step S204, and a process of questioning the name of the receiving person to be met is performed in Step S208.

On the other hand, when the visit of the visitor 3 is not a visit of the first time in Step S202 (Step S202: NO), the reception system 1 skips the processes of Step S203 to Step S211 similarly to the first embodiment and causes the process to proceed to Step S212.

(Step S212) The visitor recognition unit 21 performs a process of Step S212 similarly to Step S112 (FIG. 5) and causes the process to proceed to Step S213.

(Step S213) When a plurality of receiving persons are associated with the visitor, the receiving person selection unit 26 selects a plurality of receiving persons by using the information of the visit history database 251 of the reception information storage unit 25 and thereby estimates a plurality of receiving persons.

(Step S214) The call person selection unit 262 sorts a plurality of candidates of the receiving person. The call person selection unit 262 may perform sorting in the order of most to least of the number of times of meeting the visitor or may perform sorting in the order of latest to earliest of the date of meeting the visitor. When the number of receiving person as a candidate is a predetermined number or more as a result of sorting, the call person selection unit 262 may extract receiving persons of a predetermined number from the higher order.

(Step S215) The action generation unit 261 outputs the name of the receiving person 3 and speech information of confirming the candidate of the name of the receiving person to be met to the speech synthesis unit 12 in the order of the sorted candidates in accordance with the scenario and thereby presents the candidates to the visitor 3 via speech.

(Step S216) The visitor 3 performs speech indicating whether or not a receiving person whom the visitor wants to meet is present in the presented candidates. The visitor recognition unit 21 performs speech recognition and language comprehension with respect to the speech signal collected by the sound collection unit 11 and determines whether or not the name of the candidate of the receiving person is correct based on a recognition result of whether or not the speech indicates a positive answer. The visitor recognition unit 21 causes the process to proceed to Step S219 when it is determined that the name of the candidate of the receiving person is correct (Step S216; YES) and causes the process to proceed to Step S217 when it is determined that the name of the candidate of the receiving person is incorrect (Step S216; NO).

(Step S217) The action generation unit 261 sets the receiving person to be met to the next candidate and causes the process to proceed to Step S218.

(Step S218) The action generation unit 261 determines whether or not the next candidate is present. The action generation unit 261 causes the process to return to Step S215 when the next candidate is present (Step S218: YES) and causes the process to return to Step S204 when the next candidate is absent (Step S218: NO). Even when there are a plurality of candidates of the receiving person, the reception system 1 repeats Steps S215 to S218 and thereby outputs, with respect to a plurality of receiving persons, speech of confirming the name of the visitor 3 and the candidate of the name of the receiving person in the order of the sorted candidates in Step S214. When speech indicating a positive answer with respect to a candidate is recognized, the reception system 1 selects the candidate as a receiving person and causes the process to proceed to Step S219.

As described above, when it is determined that the visit of the visitor 3 is not a visit of the first time in Step S202, similarly to the first embodiment, the reception system 1 skips the processes of Step S203 to Step S211 which are a process of explaining the role of the robot, a process of questioning the name of the visitor 3, and a process of questioning the name of the receiving person to be met. Then, the reception system 1 extracts a plurality of candidates of the receiving person based on the history of the past in Step S213 and Step S214 and outputs, with respect to the plurality of receiving persons, speech of confirming the name of the visitor 3 and the candidate of the name of the receiving person to be met in the order of the sorted candidates in Step S214 by repeating Steps S215 to S218.

(Step S219) The reception system 1 performs the processes of Step S219 to Step S220, similarly to the processes of Step S116 to Step S117 (FIG. 5).

Next, a specific example of the reception operation of the reception system 1 according to the present embodiment is described.

FIG. 10 and FIG. 11 are views for describing an operation at the reception system 1 according to the present embodiment. In the present embodiment, the receiving person whom the visitor 3 has visited in the past is extracted as a candidate to be met from visit history of the past. Then, the candidates of the receiving person are sorted in the order of most to least of the number of times of meeting the visitor or in the order of latest to earliest of the date of meeting the visitor. FIG. 10 shows three receiving persons extracted with respect to a visitor ("Mr. Yamada"). The view of a region represented by reference numeral g201 of FIG. 10 is an example in which the candidates are sorted in the order that the visit date is closer to the current date. In most cases, the person to be visited is the same as the most recent visited person, and therefore, when the candidates to be met are sorted in the order of latest to earliest of the date of visit, the probability that the candidate becomes a correct receiving person to be met is enhanced. The view of a region represented by reference numeral g202 of FIG. 10 is an example in which the candidates are sorted in the order of most to least of the number of times of visit. In most cases, a visitor visits the same person, and therefore, when the candidates are sorted in the order of the most to least of the number of times of visit, the probability that the candidate becomes a correct receiving person to be met is enhanced.

When a plurality of receiving persons having the same number of times of visit are present, the call person selection unit 262 may compare the date of visit and may perform sorting such that a receiving person having a newer date of visit is in the higher order than a receiving person having an older date of visit. Alternatively, the call person selection unit 262 may perform sorting in a predetermined order such as an alphabetical order.

When a receiving person as a candidate to be met is determined, as shown in FIG. 11, the robot 2 performs speech of confirming the receiving person to be visited in the order of the candidate to be met as shown in FIG. 10. The person to be met by the visitor 3 is Mr. Miyake of the first development division. The candidates of the visitor are sorted in the order that the visit date is closer to the current date as shown in the view of the region represented by reference numeral g201 of FIG. 10.

First, the robot 2 outputs speech R41 ("Hello, Mr. Tanaka. Are you here to visit Mr. Suzuki of the second development division?") of confirming the receiving person to be visited.

The visitor 3 performs speech indicating whether or not the person to be met is correct in response to the speech R41 of confirming the receiving person to be visited. The visitor 3 performs speech H41 ("No.") indicating a negative answer in response to the speech R41.

When the confirmation result of the person to be met is negative, the robot 2 moves to the next candidate and outputs speech R42 ("Are you here to visit Mr. Miyake of the first development division?") confirming the receiving person to be visited.

The visitor 3 performs speech indicating whether or not the person to be met is correct in response to the speech R42 of confirming the receiving person to be visited. The visitor 3 performs speech H42 ("Yes.") indicating a positive answer in response to the speech R42 of confirming the receiving person to be visited.

When t the confirmation result of the person to be met is positive, the robot 2 calls the department of "Mr. Miyake of the first development division" and performs speech R43 ("I'm calling Mr. Miyake. Please wait.") indicating that a phone call is currently performed. The robot 2 transmits a speech message indicating that "Mr. Tanaka has arrived at the reception" to the called person. Then, when the phone call is connected, the robot 2 outputs speech R44 ("The phone call connected. Please wait on the sofa until Mr. Miyake arrives.") indicating that the phone call is connected.

As described above, also in the present embodiment, when the visit of the visitor is the second time or more, candidates of the visitor and the receiving person are selected based on a captured image without confirming the name to the visitor and questioning about the purpose for visiting. Then, in the present embodiment, when a plurality of candidates of the receiving person are present, the candidates of the receiving person are confirmed by transmitting the candidates to the visitor via speech in the order corresponding to the number of times of meeting the visitor and the like. Thereby, the visitor can save time of a response via speech, can select an appropriate receiving person, and can call the selected receiving person.

Third Embodiment

The second embodiment is described using an example in which a plurality of candidates of the receiving person are confirmed via speech; however, the embodiment is not limited thereto. The present embodiment is described using an example in which, when a plurality of candidates of the receiving person are present, the plurality of candidates are displayed on a display unit, and a receiving person is selected by allowing a visitor to operate a touch panel.

Figure 12:
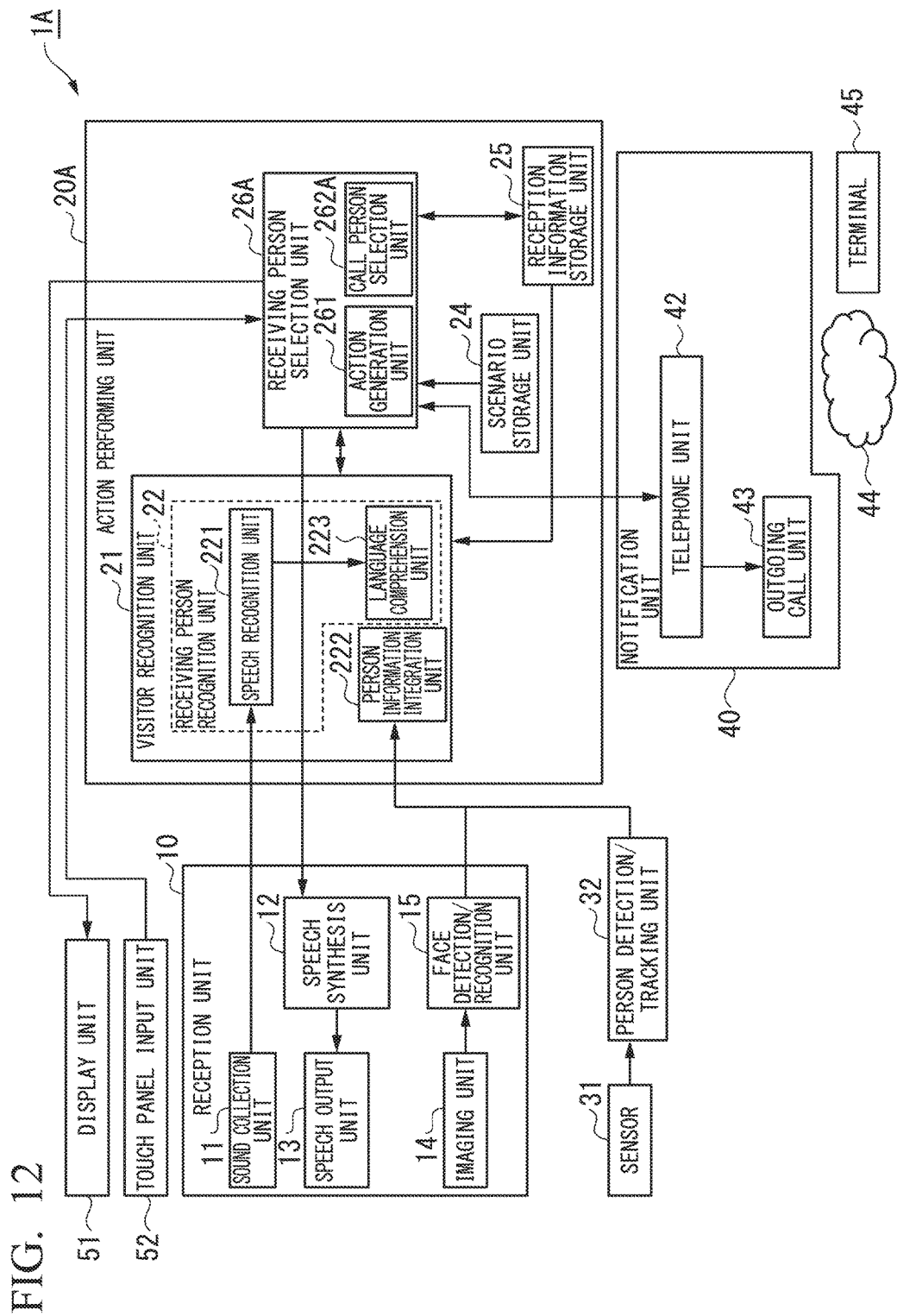
FIG. 12 is a block diagram showing a schematic configuration of a reception system according to a third embodiment.

FIG. 12 is a block diagram showing a schematic configuration of a reception system 1A according to the present embodiment. As shown in FIG. 12, the reception system 1A according to the present embodiment includes a reception unit 10, an action performing unit 20A, a sensor 31, a person detection/tracking unit 32, a notification unit 40, a terminal 45, a display unit 51, and a touch panel input unit 52. The same reference numeral is used for a function unit having the same function as that of the reception system 1, and description of the function unit is omitted.

The action performing unit 20A includes a visitor recognition unit 21, a receiving person recognition unit 22, a scenario storage unit 24, a reception information storage unit 25, and a receiving person selection unit 26A. The visitor recognition unit 21 includes a speech recognition unit 221, a person information integration unit 222, and a language comprehension unit 223. The receiving person recognition unit 22 includes the speech recognition unit 221 and the language comprehension unit 223. The receiving person selection unit 26A includes an action generation unit 261 and a call person selection unit 262A.

The display unit 51 is, for example, a liquid crystal panel, an organic electroluminescence (EL) display device, an electronic ink display device, and the like. The display unit 51 displays a text file output by the action performing unit 20A. The display unit 51 may be, for example, a mobile phone such as a smartphone, a tablet terminal, and the like. The display unit 51 may be connected to the action performing unit 20A in a wired or wireless manner.

The touch panel input unit 52 is a touch panel sensor provided on an upper surface of the display unit 51. The touch panel input unit 52 receives an operation of the visitor 3 and outputs information indicating the received operation result to the action performing unit 20A.

The call person selection unit 262A of the receiving person selection unit 26A determines a receiving person in accordance with a detection result detected by the touch panel input unit 52.

Figure 13:
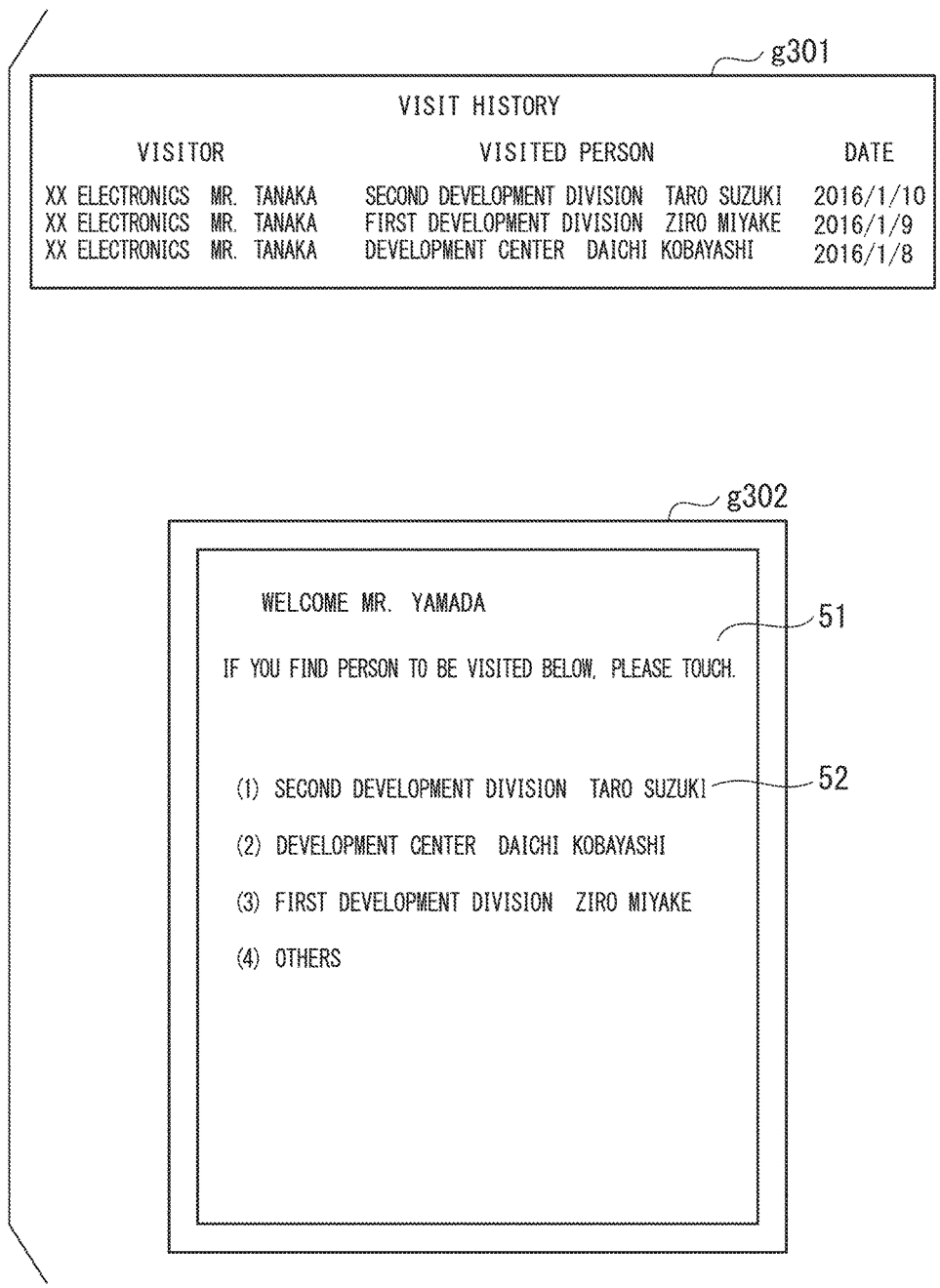
FIG. 13 is a view for describing the operation of the reception system according to the third embodiment.

FIG. 13 is a view for describing the operation of the reception system 1A according to the present embodiment. In the present embodiment, similarly to the second embodiment, the receiving person whom the visitor 3 has visited in the past is extracted as a candidate from visit history of the past. Then, the candidates of the receiving person are sorted in the order of most to least of the number of times of meeting the visitor or in the order that the date of meeting the visitor is closer to the current date. The view of a region represented by reference numeral g301 of FIG. 13 shows three receiving persons extracted with respect to a visitor ("Mr. Yamada"). The three receiving person are sorted in the order of latest to earliest of the date of meeting the visitor and become three candidates of the person to be met.

When the candidates of the person to be met are determined, as shown in a view of a region represented by reference numeral g302 of FIG. 13, a list of a plurality of receiving persons are displayed on the display unit 51. The visitor 3 can select a receiving person to be visited at this time from the display of the list of the plurality of receiving persons via an operation of the touch panel input unit 52. That is, as shown in the view of the region represented by reference numeral g302 of FIG. 13, as a candidate of the person to be met, the name of the sorted three receiving persons to be visited and "others" are displayed on the display unit 51. When a name of a receiving person to be visited is selected, the receiving person is called. When "others" is selected, a receiving person to be visited is determined via a speech input of the receiving person 3, and a receiving person acquired via the speech input is called.

The above embodiment is described using an example in which the visitor 3 sees the image displayed on the display unit 51 and operates the touch panel input unit 52 to select a receiving person; however, the embodiment is not limited thereto. When the visitor 3 sees the result displayed on the display unit 51 and speaks the name of the receiving person whom the visitor 3 wants to meet, the displayed number, and the like via speech, the reception system 1A may perform speech recognition with respect to the spoken speech signal and thereby select a receiving person.

As described above, in the present embodiment, the list of the candidate of the receiving person is displayed on the display unit 51, and the visitor 3 selects a receiving person whom the visitor 3 wants to meet from the list via an operation of the touch panel input unit 52. Thereby, also in the present embodiment, when the visit of the visitor is the second time or more, candidates of the visitor and the receiving person are selected based on a captured image without confirming the name to the visitor and questioning about the purpose for visiting. Then, in the present embodiment, when a plurality of candidates of the receiving person are present, the candidates of the receiving person are confirmed by transmitting the candidates to the visitor by displaying the candidates on the display unit 51 in the order corresponding to the number of times of meeting the visitor and the like. Thereby, the visitor can save time of a response via speech, can select an appropriate receiving person, and can call the selected receiving person.

The reception system 1 (or 1A) may detect the travel direction of a person based on a detection value of the sensor 31 or an image captured by the imaging unit 14 and may detect whether the person is a visitor or the person is a person who has finished a meeting and is leaving. Then, the reception system 1 (or 1A) may start the operation of the reception system when the person is a visitor and may produce speech "Have a nice day." and the like without repeating questioning about the purpose for visiting and the like when the person is a person who is leaving.

The above embodiment is described using an example in which the reception system 1 (or 1A) changes an action between a visitor of the first time and a visitor of the second time or more; however, the embodiment is not limited thereto. In accordance with the scenario stored by the scenario storage unit 24, the action may be switched depending on the number of times of visit, for example, for the third time or more. For example, questioning and the like may be skipped, or a different process may be performed. In this case, the scenario storage unit 24 stores a scenario depending on the number of times of visit of a visitor in advance.

For example, the reception system 1 (or 1A) may store the name of the visitor and the date of visit together with the face image of the visitor 3, may greet a customer who has not visited for a predetermined period from the last visit, for example, for one year using speech "Mr. A, how have you been?", and may greet other customers using speech "Mr. A, thank you for your visit.". That is, the reception system 1 (or 1A) may change the greeting depending on the visit history of the visitor 3. By changing the greeting depending on the visitor 3, it is possible to make an appeal that the robot understands a customer, and the customer can smoothly start conversation.

When the visitor 3 and the robot 2 simultaneously speak, the reception system 1 (or 1A) may stop speech of the robot 2 or may start speech after an interval when the robot 2 produces speech next time. In this way, a smooth turn taking can be realized, and even a customer of the first visit can make smooth conversation.

When determining whether or not the visitor 3 visits for the first time, the visitor recognition unit 21 performs a matching calculation between the face image of the visitor 3 captured by the imaging unit 14 and the face image of the visit history database 251. The visitor recognition unit 21 may change the scenario depending on the degree of matching. For example, a threshold value may be set for a matching amount between the face image of the visitor 3 captured by the imaging unit 14 and the face image of the visit history database 251, and the reception system 1 (or 1A) may perform greeting using speech "Hello, Mr. A." when the matching amount is the threshold value or more and may perform greeting using speech "Are you Mr. A?" when the matching amount is less than the threshold value.

As described above, according to the embodiment described above, the response presented to the visitor 3 based on the scenario is changed based on the captured image, and therefore, it is possible to simplify a redundant reception service.

Further, according to the embodiment described above, it becomes unnecessary to question, to the visitor 3 who has visited a plurality of times, the affiliation and name of the visitor 3 each time, and therefore, it is possible to reduce a load of the visitor 3.

Further, according to the embodiment described above, a candidate of the receiving person is presented to the visitor 3 based on the reception history, and therefore, it is possible to increase a probability that the candidate becomes a receiving person desired by the visitor 3.

Further, according to the embodiment described above, the visitor 3 can see a list display of the receiving person and can easily select a desired receiving person.

Further, according to the embodiment described above, the response is changed in accordance with the travel direction of the visitor 3, and therefore, it is possible to simplify a redundant reception service.

A program for realizing the whole or part of the function of the reception system 1 may be recorded in a computer-readable recording medium, and the program recorded in the recording medium may be read into and executed on a computer system to thereby perform a process of each unit. It is assumed that the "computer system" used herein includes an OS or hardware such as peripherals.

It is also assumed that the term "computer system" includes a homepage provision environment (or a display environment) when a WWW system is used.

Examples of the "computer-readable recording medium" include portable media, such as a flexible disk, a magneto-optical disc, a ROM, and a CD-ROM, and a storage device such as a hard disk embedded in the computer system. Further, examples of the "computer-readable recording medium" include a recording medium that holds a program dynamically for a short period of time like a network such as the Internet or a communication line when a program is transmitted through a communication line such as a telephone line, and may include a recording medium that stores a program for a predetermined period of time like a volatile memory in a computer system which serves as a server or a client in this case. In addition, the above program may be a program for realizing some of the functions described above or may be a program capable of realizing the above functions by combination with a program already recorded in the computer system.

Although the embodiment of the invention has been described with reference to the drawings, a specific configuration is not limited to the above-described embodiment, and design changes and the like can be made without departing from the scope of the invention.

The invention claimed is:

1. A reception system, comprising:
an imaging unit that captures an image;
a reception information storage unit that stores an image of a visitor who visited in the past and information of a receiving person whom the visitor visited in the past in an associated manner; and
an action performing unit that generates a question to the visitor based on a scenario regarding a response to the visitor and acquires information via a response to the question from the visitor, wherein
the action performing unit changes a response presented to the visitor based on the scenario depending on whether or not the reception information storage unit stores an image that corresponds to the image captured by the imaging unit.

2. The reception system according to claim 1, comprising:
a notification unit that notifies a receiving person whom the visitor wants to meet of a visit of the visitor, wherein
the action performing unit selects a receiving person that corresponds to the visitor based on information of a receiving person stored by the reception information storage unit whom the visitor visited without making a question for acquiring information regarding the visitor to the visitor when the reception information storage unit stores an image that corresponds to the image captured by the imaging unit, and wherein
the notification unit notifies the receiving person selected by the action performing unit of a visit of the visitor.

3. The reception system according to claim 2, wherein
the action performing unit makes a question for acquiring information of the visitor and information of the receiving person to the visitor using a speech signal in accordance with the scenario when the reception information storage unit does not store an image that corresponds to the image captured by the imaging unit and selects a receiving person that corresponds to the visitor based on a result of performing speech recognition with respect to a speech signal of a response to the question.

4. The reception system according to claim 1, wherein
the action performing unit stores a history of visit of the visitor in the past in the reception information storage unit with respect to the visitor, selects a candidate of the receiving person based on the history stored by the reception information storage unit when the reception information storage unit stores an image that corresponds to the image captured by the imaging unit, presents, when the number of the selected candidate of the receiving person is two or more, the plurality of the receiving persons as a candidate to the visitor by using a speech signal, and selects a receiving person that corresponds to the visitor based on a result of performing speech recognition with respect to a speech signal of a response to the question.

5. The reception system according to claim 1, wherein the action performing unit stores a history of visit of the visitor in the past in the reception information storage unit with respect to the visitor, selects a candidate of the receiving person based on the history stored by the reception information storage unit when the reception information storage unit stores an image that corresponds to the image captured by the imaging unit, and presents, when the number of the selected receiving person is two or more, the plurality of the receiving persons as a candidate to the visitor by using an image.

6. The reception system according to claim 4, wherein the action performing unit presents a candidate of the receiving person in the order of most to least of the number of times of visit when the number of the selected candidate of the receiving persons is two or more.

7. The reception system according to claim 4, wherein the action performing unit presents a candidate of the receiving person in the order of latest to earliest of visit when the number of the selected candidate of the receiving persons is two or more.

8. The reception system according to claim 1, comprising:
a detection unit that detects a travel direction of the receiving person, wherein
the action performing unit changes a response presented to the visitor based on at least one of a travel direction of the visitor detected by the detection unit and a travel direction obtained by detecting a travel direction of the receiving person from the image captured by the imaging unit.

9. A reception method, comprising:
(a) by way of an imaging unit, capturing an image;
(b) by way of an action performing unit, storing an image of a visitor who visited in the past and information of a receiving person whom the visitor visited in the past in an associated manner in a reception information storage unit; and
(c) by way of the action performing unit, changing a response presented to the visitor based on a scenario regarding a response to the visitor depending on whether or not the reception information storage unit stores an image that corresponds to the image captured in (a).

\* \* \* \* \*